(12) United States Patent
Goveas et al.

(10) Patent No.: US 9,110,802 B2
(45) Date of Patent: Aug. 18, 2015

(54) PROCESSOR AND METHOD IMPLEMENTED BY A PROCESSOR TO IMPLEMENT MASK LOAD AND STORE INSTRUCTIONS

(75) Inventors: Kelvin Goveas, Austin, TX (US); Edward McLellan, Holliston, MA (US); Steven Beigelmacher, Somerville, MA (US); David Kroesche, Austin, TX (US); Michael Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1094 days.

(21) Appl. No.: 12/940,591

(22) Filed: Nov. 5, 2010

(65) Prior Publication Data

US 2012/0117420 A1    May 10, 2012

(51) Int. Cl.
*G06F 9/30* (2006.01)
*G06F 11/07* (2006.01)

(52) U.S. Cl.
CPC ........ *G06F 11/0793* (2013.01); *G06F 9/30018* (2013.01); *G06F 9/30036* (2013.01); *G06F 9/30043* (2013.01); *G06F 11/0721* (2013.01)

(58) Field of Classification Search
None
See application file for complete search history.

(56) References Cited

U.S. PATENT DOCUMENTS

| 5,574,928 | A  | * | 11/1996 | White et al. ................. 712/23 |
| 6,713,238 | B1 | * | 3/2004  | Chou et al. ................. 430/322 |
| 2002/0114449 | A1 | * | 8/2002  | Cheng et al. ................. 380/28 |
| 2004/0059898 | A1 | * | 3/2004  | Baxter et al. ................. 712/235 |
| 2009/0172365 | A1 | * | 7/2009  | Orenstien et al. ............. 712/225 |

* cited by examiner

*Primary Examiner* — William B Partridge

(57) ABSTRACT

A method of implementing a mask load or mask store instruction by a processor is provided. The method may include receiving the mask load or mask store instruction, a location of a memory operand and a location of corresponding mask bits associated with the memory operand, breaking the received memory operand into a plurality of sub-operands and executing the mask load or mask store instruction on each of the plurality of sub-operands using a fastpath operation or using microcode, wherein the respective mask load or mask store instruction loads or stores each of the plurality of sub-operands based upon the corresponding mask bits.

27 Claims, 4 Drawing Sheets

PROCESSOR AND METHOD IMPLEMENTED BY A PROCESSOR TO IMPLEMENT MASK LOAD AND STORE INSTRUCTIONS

FIELD OF THE INVENTION

The present invention generally relates to a processor and more particularly to a processor configured to handle floating point and single-instruction multiple data (SIMD) processing.

BACKGROUND OF THE INVENTION

Computer processors may be designed to handle various instruction sets. One such instruction set is the x86 instruction set. Processors may have vastly different micro-architecture for implementing the same instruction set. Ideally, processors have an internal operation ("op") for each instruction in the instruction set. The op may be designed to accomplish the instruction in as few processing cycles as possible. However, having dedicated micro-architecture so that each instruction has a corresponding op can be expensive, both in terms of design costs and to amount of space the added micro-architecture requires in the processor.

The x86 instruction set has recently been expanded to include advanced vector extension ("AVX") which are directed to floating point intensive processing operations and particularly architected for SIMD processing. Accordingly, it is desirable to have a processor configured to implement the these and other similar instruction sets and a method for the processor to execute the new instructions. Other desirable features and characteristics of the present invention will become apparent from the subsequent detailed description of the invention and the appended claims, taken in conjunction with the accompanying drawings and this background of the invention.

BRIEF SUMMARY

A method of implementing a mask load or mask store instruction by a processor, is provided. The method includes receiving the mask load or mask store instruction, a location of a memory operand, a location of corresponding mask bits associated with the memory operand. The method further includes breaking the received memory operand into a plurality of sub-operands and executing the mask load or mask store instruction on each of the plurality of sub-operands using microcode, wherein the respective mask load or mask store instruction loads or stores each of the plurality of sub-operands based upon the corresponding mask bits.

A processor is provided. The processor may be configured to receive a mask load or mask store instruction, a location of a memory operand and a location of corresponding mask bits associated with the memory operand. The processor may further be configured to break the received memory operand into a plurality of sub-operands and execute the mask load or mask store instruction on each of the plurality of sub-operands using microcode, wherein the respective mask load or mask store instruction loads or stores each of the plurality of sub-operands based upon the corresponding mask bits.

Another method of implementing a mask load instruction by a processor is provided. The method may include receiving the mask load instruction, a location of a memory operand and a location of corresponding mask bits associated with the memory operand and a location of a destination location, breaking the memory operand into a first plurality of sub-operands and executing the mask load instruction on each of the first plurality of sub-operands using a fastpath operation, wherein the processor loads each of the first plurality of sub-operands into the destination location based upon the corresponding mask bits. The method may further include, if a fault occurred during the fastpath operation, breaking the memory operand into a second plurality of sub-operands, the second plurality of sub-operands having more sub-operands than the first plurality of sub-operands and executing the mask load instruction on each of the second plurality of sub-operands using microcode, wherein the processor loads each of the second plurality of sub-operands into the destination location based upon the corresponding mask bits.

Another exemplary processor is provided. The processor may be configured to receive the mask load instruction, a location of a memory operand and a location of corresponding mask bits associated with the memory operand and a location of a destination location, break the memory operand into a first plurality of sub-operands and execute the mask load instruction on each of the first plurality of sub-operands using a fastpath operation, wherein the processor loads each of the first plurality of sub-operands into the destination location based upon the corresponding mask bits. The processor, if a fault occurred during the fastpath operation, may be further configured to break the memory operand into a second plurality of sub-operands, the second plurality of sub-operands having more sub-operands than the first plurality of sub-operands and execute the mask load instruction on each of the second plurality of sub-operands using microcode, wherein the processor loads each of the second plurality of sub-operands into the destination location based upon the corresponding mask bits.

BRIEF DESCRIPTION OF THE DRAWINGS

The present invention will hereinafter be described in conjunction with the following figures.

DETAILED DESCRIPTION OF THE DRAWINGS

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
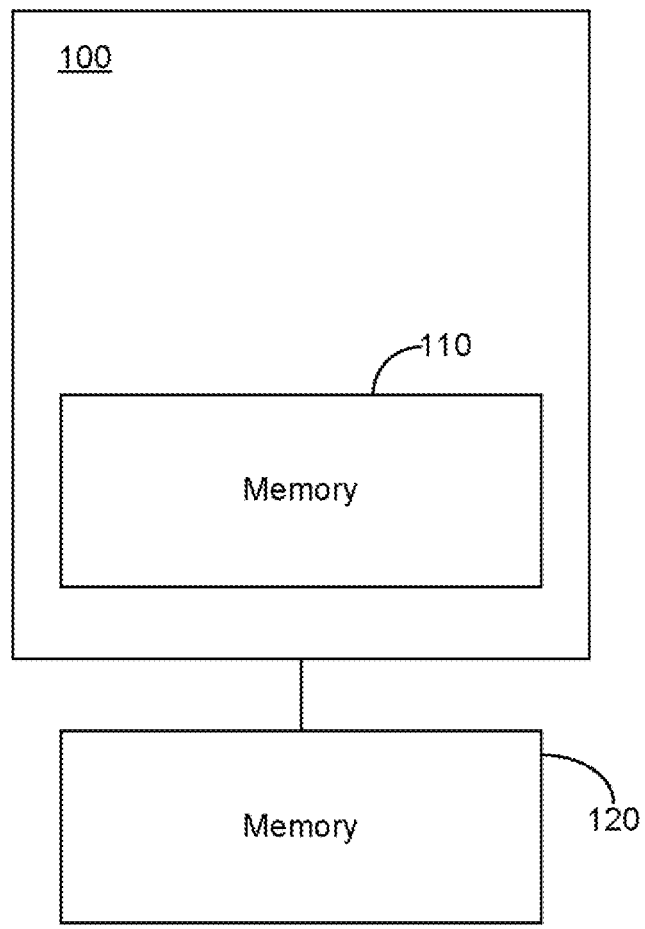
FIG. 1 illustrates an exemplary processor in accordance with an embodiment.

FIG. 1 illustrates an exemplary processor 100. The processor 100 includes an internal memory 110 and may further be connected to an external memory 120. The processor 100 is configured to use microcode and/or fastpath operations to execute advanced vector extensions ("AVX"), which are an extension of the x86 instruction set architecture, as discussed in further detail below. The processor 100 may be integrated within any computer system and be configured to execute instructions as is know in the art.

While a general computer processing unit ("CPU") is discussed herein, the principles of the described embodiments can be implemented in various other processors, such as a graphical processing unit ("GPU").

The AVX instruction set expands the size of single instruction multiple data ("SIMD") vector registers from 128-bits to 256-bits. Further extensions to 512 or 1024 bits are expected in the future. The AVX instruction set also allows for non-destructive instructions. While the embodiments discusses herein will reference mask load and mask store instructions (VMASKMOVPS or VMASKMOVPD) from the AVX extended instruction set, the principles discussed herein can be applied to other instructions from the AVX extended instruction set or other instructions which make use of mask bits.

Ideally, each instruction that a processor receives (add, subtract, load, store, etc) will have a one-to-one correspondence with an internal operation ("op"). The processor may be designed to execute each of the ops in as few processing cycles as possible. When there is a corresponding op (or 2 ops which is fastpath double) for an instruction, the instruction is said to be executed along a fastpath. However, adding additional hardware to the processor to have an op for each of the new AVX instructions can be costly, both in terms of the time it takes to design the new hardware and the amount of space the new hardware would take on the processor itself. Accordingly, the embodiments described herein preferably use microcode when fastpath operation is unavailable as described in further detail below.

Microcode is a layer of hardware-level instructions and/or data structures involved in the implementation of higher level machine code instructions. The microcode resides in internal memory 110, which may be a high speed memory, incorporated into the processor 100 and translates machine instructions into sequences of detailed circuit-level operations. Unlike machine code which often retains some compatibility among different processors in a family, microcode only runs on the exact processor for which it's designed, as it constitutes an inherent part of the particular processor design itself. Internal memory 110 consists of level 1 instruction cache and level 1 data cache. The microcode resides in a set of read-only memory (ROM) modules located in an instruction decode unit within the processor 100. An instruction that is micro-coded generates an entry point into the ROM. A microcode sequencer, which executes the microcode instruction, sequences through all the ops in the ROM. Each line of ops in the microcode can have up to 4 ops, which matches the width of the fastpath op dispatch. In one embodiment, when the sequencer is sequencing through microcode lines to execute the instruction, the decode unit may not be able to issue fastpath ops if there is a multiplexor used to select between fastpath issue or microcode issue.

Figure 2:
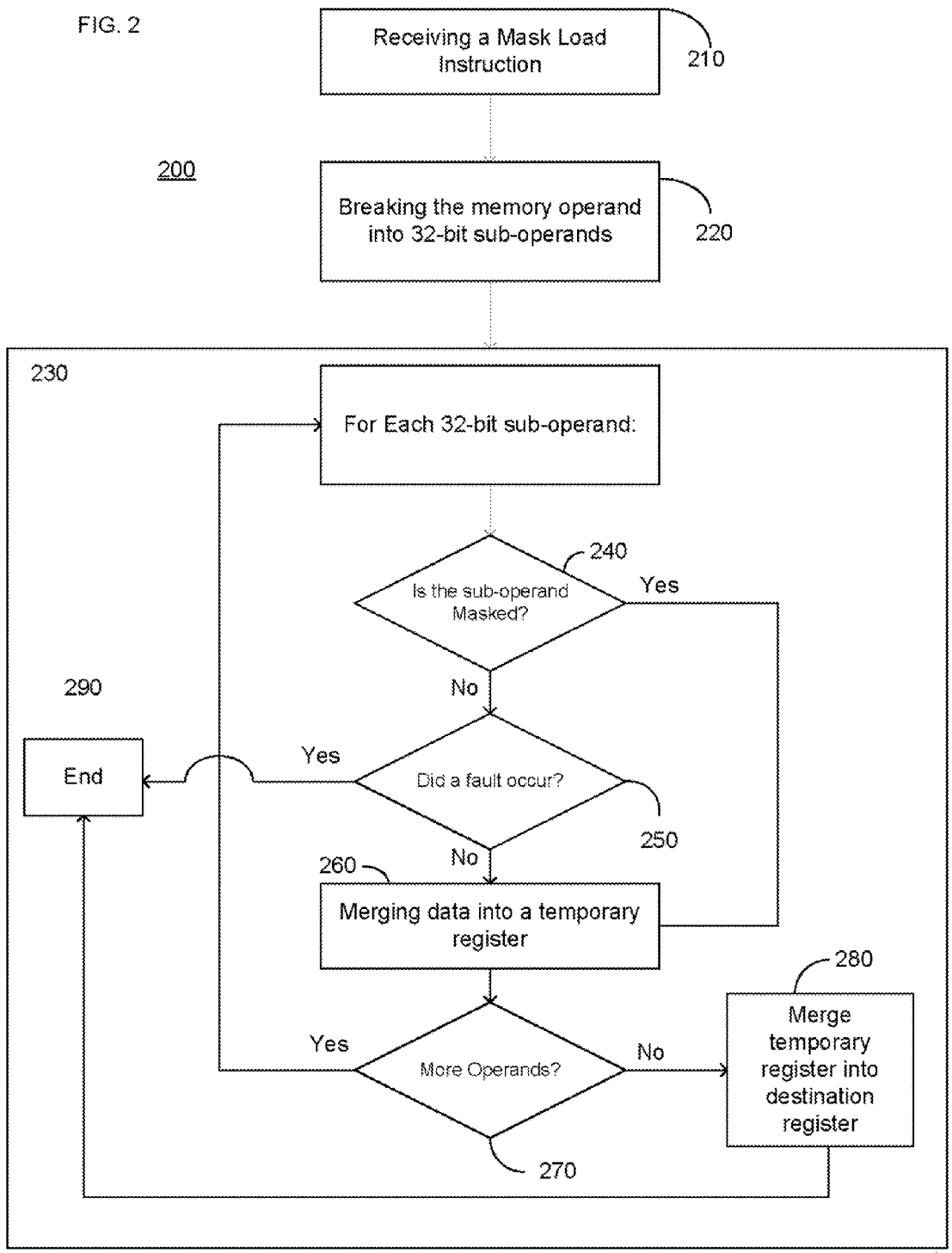
FIG. 2 illustrates an exemplary method for implementing a mask load instruction by a processor in accordance with an embodiment.

FIG. 2 illustrates an exemplary method 200 for a processor for handling a masked load instruction in accordance with an embodiment. The processor first receives the masked load instruction. (Step 210). The received masked load instruction may include a location in a memory where the memory operand, i.e. data, will be loaded from and a destination register where the data will be stored. The masked load will also have a location where mask bits, corresponding to portions of the data, are stored. The masked load instruction may be, for example, VMASKMOVPS or VMASKMOVPD. The VMASKMOVPS ("Pack Single") instruction has 128-bit and 256-bit variants, both of which have 32-bit sub-operands. The VMASKMOVPD ("Pack Double") instruction also has 128-bit and 256-bit variants, both of which have 64-bit sub-operands. The method 200 will be described herein based upon a 256-bit VMASKMOVPS instruction, but can be modified to handle any of the mask load or store instructions.

As discussed above, the 256-bit VMASKMOVPS instruction has a 256-bit memory operand and 32-bit sub-operands. The corresponding mask bits may be in another 256-bit operand stored in a memory (hereinafter "mask operand"). The mask bit corresponding to each memory sub-operand may be stored in a most significant bit of a corresponding 32-bit portion of the mask operand. The mask operand is the $2^{nd}$ operand of the VMASKMOV* instruction and will be set by the user prior to issuing the instruction. As discussed herein, the memory operand may be the same size as the mask operand. However, in other embodiments, the mask operand may be smaller than the memory operand. However, when the mask operand is smaller than the memory operand, the mask operand should at least have one bit for every sub-operand in the memory operand.

The processor, after receiving the instruction, breaks up the 256-bit memory operand into eight 32-bit sub-operands. (Step 220). 8 separate load μops are issued from microcode to load each 32-bit piece individually. Therefore, 8 addresses are generated. The processor then executes a load instruction on each sub-operand in turn using microcode. (Steps 230-280). Microcode can dispatch 4 μops at a time. Each maskmov operation on a sub-operand consists of a 32-bit load and a 32-bit merge with destination operand using mask bit. There will be a total of 2×8=16 μops to complete the whole instruction from microcode. The 16 μops can get dispatched 4 μops at a time, and execution bandwidth will be limited by the core resources (2 loads per clock, 2 FP ops per clock).

The load instruction 230 includes a step for determining if one of the sub-operands is masked. (Step 240). In one exemplary embodiment, if the mask bit is a "0" (zero), the processor will mask the corresponding sub-operand. That is, the processor may, for example, load zeros into a corresponding portion of the temporary register. (Step 260). The other portions of the temporary register corresponding to other sub-operands will retain their current value. If the mask bit is a "1" (one), the process continues to step 250. Accordingly, the sub-result in the destination operand may be set to 0's if the mask bit is 0 for the VMASKMOV load version. The data in memory, however, is not modified for the VMASKMOV store version if the corresponding mask bit is 0.

The processor may then determine if there is a fault corresponding to an unmasked 32-bit sub-operand. (Step 250). If there is a fault in a sub-operand and the sub-operand is not masked by a corresponding mask bit, the processor ends the mask load instruction and may report the error. (Step 290). When a fault occurs in an unmasked sub-operand, the destination register does not get updated. The faults may be, for example, a page fault, a protection faults, a data cache miss (line is not in the cache) or translation look aside buffer (TLB) miss (page mapping does not exist in the TLB).

Protection faults occur when a program attempts invalid page accesses, for example trying to access pages not mapped into its memory, tries to write to read-only pages, or tries to modify privileged pages.

The processor may then, if the sub-operand which is unmasked and does not have a fault, merge the data from the corresponding sub-operand into the corresponding position of in a temporary register. (Step 260). The other portions of the temporary register corresponding to other sub-operands will retain their current value. If there are more sub-operands, the processor will then return to step 230 and repeat the process for the remaining sub-operands. (Step 270). If there are no more sub-operands the processor copies the temporary register into the destination register (Step 280) and the process ends (Step 290). In some embodiments, when a fault has occurred in an unmasked bit, the fault will be reported to a central scheduler or a retrieve queue. The scheduler will report the fault when the op becomes the oldest in the machine and will redirect to part to the architectural exception handler. However, if a fault occurs in a sub-operand masked by a corresponding mask bit, the fault will not be reported.

Figure 3:
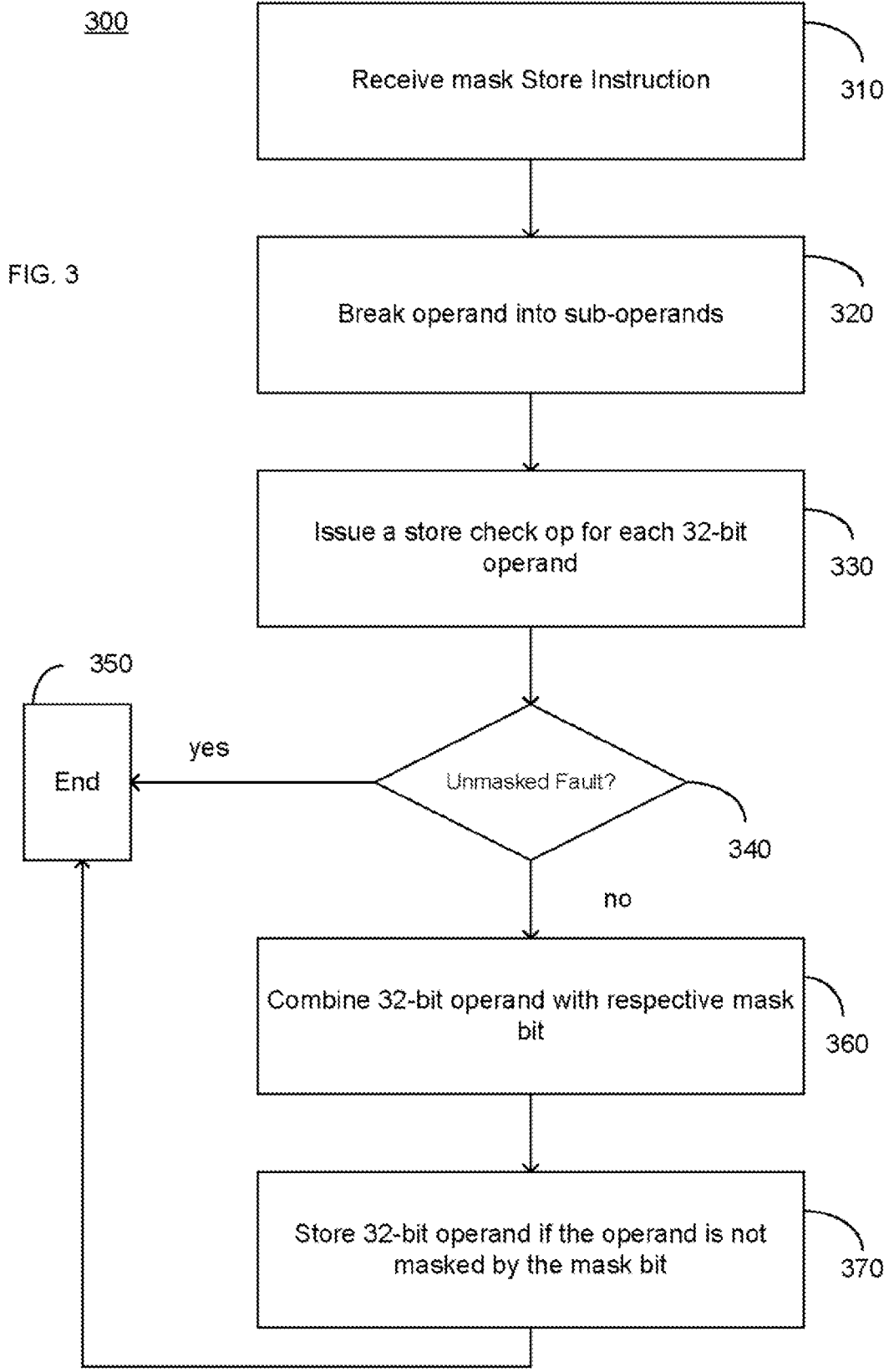
FIG. 3 illustrates an exemplary method for implementing a mask store instruction by a processor in accordance with an embodiment.

FIG. 3 illustrates an exemplary method 300 for handling a 256-bit mask store instruction using microcode. The processor first receives the 256-bit mask store instruction. (Step 310). The processor may then break the 256-bit operand into eight 32-bit operands. (Step 320). The processor may then issue a store-check operation for each of the 32-bit operands. (Step 330). The store-check operation checks for any faults before the data is stored. If any one of the eight 32-bit operands has a fault and the respective 32-bit operand is not masked by a respective mask bit (Step 340), the processor signals a fault and none of the 32-bit operands are stored. (Step 350). If one of the 32-bit operands has a fault, but the operand is masked by the associated mask bit, the processor proceeds with the store instruction. The processor will then issue eight operations to combine a respective mask bit with its 32-bit operand. (Step 360). The combine instruction may be, for example, a fkmask32imm operation. The processor sends the 33-bit result to a load/store unit, which does a conditional store of bits 31:0 based on bit 32. (Step 370).

Figure 4:
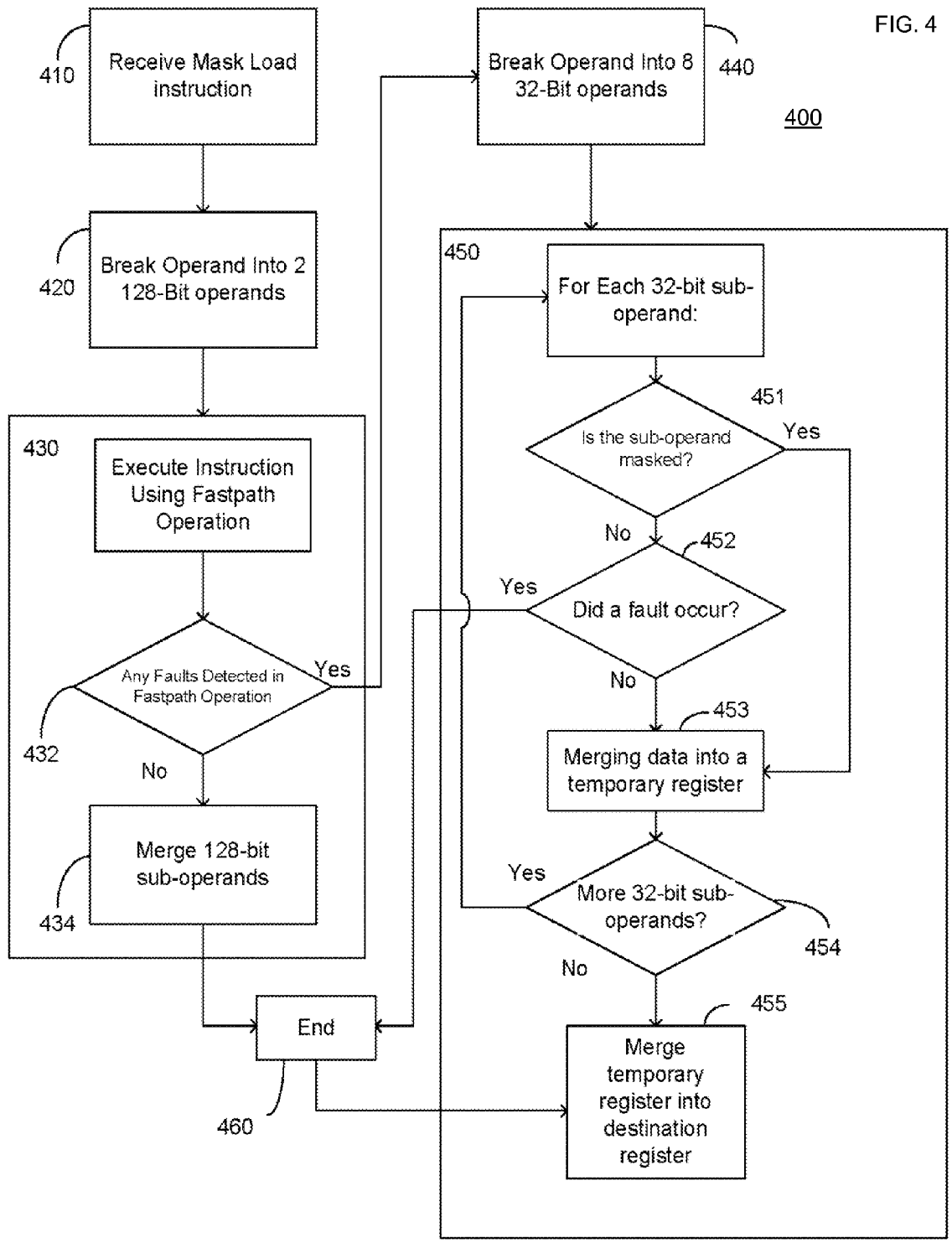
FIG. 4 illustrates another exemplary method for implementing a mask load instruction by a processor in accordance with an embodiment.

FIG. 4 illustrates another exemplary method 400 by a processor for handling mask load instructions. In this embodiment the processor first executes a fastpath version of the instruction which breaks up the 256-bit operand into 2×128-bit sub-operands using 2 μops. Each uop can perform a VMASKMOV load for 4×32-bit pieces using 4 mask bits. Only if a fault is detected on either of the 2 μops and there is at least 1 mask bit that is not zero across both 128-bit pieces, is the slower alternate microcode flow invoked. One benefit of this embodiment is that the fastpath operation is faster than the microcode operation. If faults are rare, the processor will be able to execute the mask load instruction using the faster fastpath operation a majority of the time and only executes the slower microcode operation when faults occur.

The processor first receives the mask load instruction. (Step 410). If the processor has a maximum native data size less then a size of the operand of the mask load instruction, the processor may then break the operand into multiple sub-operands, preferable to the same size as the maximum native data size to maximize throughout. (Step 420). For example, if the maximum native data size of the processor is 128-bits and the mask load instruction has a 256-bit operand, the processor will break the operand into two 128-bit sub-operands. The method 400 will be explained using a 256-bit variant of the VMASKMOVPS masked load instruction; however, the method can be modified to handle any of the various types of masked load instructions discussed herein.

The processor then executes the mask load instruction on the operand, or each of the 128-bit sub-operands, using a fastpath operation. (Step 430). The mask load instruction has three sources, a location of the memory operand to be loaded, a location of the destination the memory operand is to be loaded to and a location of the mask bits associated with the memory operand. The locations may be, for example, internal registers or memory in the processor or an external memory. The processor may be configured to handle a 128-bit mask load instruction with three sources via an op. The processor then determines if a fault occurred. (Step 432). If no fault occurred, the processor will merge the data from the data source location to the destination location, taking into account the corresponding mask bits in accordance with the methods discussed herein (Step 434) and the process will end. (Step 460). As discussed above, if a respective portion of the operand or sub-operand of the data is masked by a corresponding mask bit, the respective portion of the operand sub-operand will not be merged during the mask load instruction.

If a fault occurred in the fastpath execution for either of the 128-bit sub-operands (Step 432) the processor flushes both operands and re-executes the instruction in a slow mode using microcode (Steps 440-458).

In contrast to the fastpath mask load operation, which, when operating on an 128-bit sub-operand, flushes the entire 256-bit mask-load instruction when any fault occurs, the slow mode operation, using microcode, further delineates the 128-bit operand and operates on the delineated operands.

The processor breaks the 256-bit memory operand into eight 32-bit sub-operands. (Step 440). The processor then executes the mask load instruction using microcode. (Step 450). The processor, for each of the 32-bit sub-operands, determines if the respective sub-operand is masked by a corresponding mask bit. (Step 451) If the sub-operand is masked, the processor inserts zeros into a respective portion of a temporary register corresponding to the masked sub-operand. (Step 453). The other portions of the temporary register corresponding to other sub-operands will retain their current value. The processor may then determine if there is a fault corresponding to the respective 32-bit sub-operand. (Step 452). If a fault has occurred in an unmasked sub-operand, the processor ends the process and may report the error. (Step 460). The processor will then, if the sub-operand is unmasked and does not have a fault, merge the data from corresponding to the sub-operand into a corresponding position in a temporary register. (Step 453). The other portions of the temporary register corresponding to other sub-operands will retain their current value. If there are more sub-operands, the processor will then return to step 450 and repeat the process for the remaining sub-operands. (Step 454). If there are no more sub-operands the processor merges the temporary register into the destination register. (Step 455). The process then ends. (Step 460).

One benefit of the embodiment, for example, is that the processor can implement the masked load/store instruction with one set of hardware that only detects faults on one sub-operand. For the load version, this speeds up the instance where there are no faults and the instance if there are faults but all of the corresponding sub-operands are masked by the associated mask bits, since the load instruction can be accomplished in the fast mode. Another benefit of the embodiment is that the use of microcode to implement the masked load and store instructions reduces the amount of hardware required to implement the instructions on the processer.

In another embodiment, when there is a fault detected in the fastpath operation in step 432, the processor only re-executes the instruction using microcode if there is an unmasked bit anywhere in the operand. Therefore, in this embodiment, the processor speeds up the case when there is a fault but all of the sub-operands are masked by respective mask bits.

Physical embodiments of the subject matter described herein can be realized using existing semiconductor fabrication techniques and computer-implemented design tools. For example, hardware description language code, netlists, or the like may be utilized to generate layout data files, such as Graphic Database System data files (e.g., GDSII files), associated with various logic gates, standard cells and/or other circuitry suitable for performing the tasks, functions, or operations described herein. Such layout data files can be used to generate layout designs for the masks utilized by a fabrication facility, such as a foundry or semiconductor fabrication plant (or fab), to actually manufacture the devices, apparatus, and systems described above (e.g., by forming, placing and routing between the logic gates, standard cells and/or other circuitry configured to perform the tasks, functions, or operations described herein). In practice, the layout data files used in this context can be stored on, encoded on, or otherwise embodied by any suitable non-transitory computer readable medium as computer-executable instructions or data stored thereon that, when executed by a computer, processor, of the like, facilitate fabrication of the apparatus, systems, devices and/or circuitry described herein.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of implementing a mask load instruction by a processor, comprising:
   receiving the mask load instruction, a location of a memory operand and a location of corresponding mask bits associated with the memory operand and a location of a destination location;
   breaking the memory operand into a first plurality of sub-operands; and
   for each sub-operand of the first plurality of sub-operands, executing the mask load instruction on the sub-operand using a fastpath operation, wherein the processor loads the sub-operand into the destination location based upon the corresponding mask bits, and
   determining if a fault occurred while executing the mask load instruction on the sub-operand; and
   in response to determining that the fault occurred for any one of the first plurality of sub-operands, breaking the memory operand into a second plurality of sub-operands, the second plurality of sub-operands having more sub-operands than the first plurality of sub-operands.

2. The method of claim 1, wherein, if a fault occurred during the fastpath operation, the method further comprises:
   executing the mask load instruction on each of the second plurality of sub-operands using microcode, wherein the processor loads each of the second plurality of sub-operands into the destination location based upon the corresponding mask bits.

3. The method of claim 2, wherein the processor loads a respective sub-operand into a destination location if the respective sub-operand is not masked by an associated mask bit.

4. The method of claim 3, further comprising:
   reporting, if the determining determined that a fault occurred, the fault if the fault is associated with a sub-operand that is not masked by an associated mask bit.

5. The method of claim 2, wherein the processor loads each of the second plurality of sub-operands into a destination location based upon a respective position of the each of the second plurality of sub-operands within the memory operand.

6. The method of claim 2, wherein the breaking further comprises breaking the memory operand into a plurality of sub-operands based upon a type of mask load instruction received by the processor.

7. The method of claim 3, wherein the processor loads 0's into a respective sub-operand if the respective sub-operand is masked.

8. The method of claim 1, wherein if a fault occurs during the fastpath operation and all of the sub-operands are masked, the processor flushes the instruction.

9. A processor configured to:
   receive a mask load instruction, a location of a memory operand and a location of corresponding mask bits associated with the memory operand and a location of a destination location;
   break the memory operand into a first plurality of sub-operands;
   for each sub-operand of the first plurality of sub-operands, execute the mask load instruction on the sub-operand using a fastpath operation, wherein the processor loads the sub-operand into the destination location based upon the corresponding mask bits, and
   determine if a fault occurred while executing the mask load instruction on the sub-operand using the fastpath operation; and
   in response to determining that the fault occurred for any one of the first plurality of sub-operands, break the memory operand into a second plurality of sub-operands, the second plurality of sub-operands having more sub-operands than the first plurality of sub-operands.

10. The processor of claim 9, wherein, if a fault occurred during the fastpath operation, the processor is further configured to:
    execute the mask load instruction on each of the second plurality of sub-operands using microcode, wherein the processor loads each of the second plurality of sub-operands into the destination location based upon the corresponding mask bits.

11. The processor of claim 9, wherein the processor is further configured to load a respective sub-operand into a destination location if the respective sub-operand is not masked by an associated mask bit.

12. The processor of claim 10, wherein the processor is further configured to:
    report, if the processor determined that a fault occurred, the fault if the fault is associated with a sub-operand that is not masked by an associated mask bit.

13. The processor of claim 9, wherein the processor is further configured to load each of the second plurality of sub-operands into a destination location based upon a respective position of the each of the second plurality of sub-operands within the memory operand.

14. The processor of claim 9, wherein the processor is further configured to break the memory operand into a plurality of sub-operands based upon a type of mask load instruction received by the processor.

15. The processor of claim 9, wherein the processor is further configured to load 0's into a respective sub-operand if the respective sub-operand is masked.

16. The processor of claim 9, wherein if a fault occurs during the fastpath operation and all of the sub-operands are masked, the processor is further configured to flush the instruction.

17. A computer system, comprising:
    a processor; and
    wherein the processor is configured to:

receive a mask load instruction and a location in a memory of an operand to be loaded, execute the mask load instruction on each of a first plurality of sub-operands of the operand according to a fastpath operation to load the operand from the memory, for each sub-operand of the first plurality of sub-operands, determining if a fault occurred while executing the fastpath operation for the sub-operand, and if a fault occurs in the fastpath operation for any one of the first plurality of sub-operands, execute the mask load instruction using microcode to load the operand from memory by breaking the operand into a second plurality of sub-operands different from the first plurality of sub-operands and to execute the mask load instruction on the second plurality of sub-operands.

18. The computer system of claim 17, wherein the fastpath operation executes the mask load instruction faster than the microcode.

19. The computer system of claim 17, wherein the processor is further configured to load a respective sub-operand into a destination location if the respective sub-operand is not masked by an associated mask bit.

20. The computer system of claim 19, wherein the processor is further configured to:

determine if a fault occurred while executing the mask load instruction on each of the plurality of sub-operands; and report, if the processor determined that a fault occurred, the fault if the fault is associated with a sub-operand that is not masked by an associated mask bit.

21. The computer system of claim 20, wherein the processor is further configured to load each of the second plurality of sub-operands into a destination location based upon a respective position of the each of the second plurality of sub-operands within the operand.

22. A computer-readable non-transitory medium having computer-executable instructions or data stored thereon that, when executed, facilitate fabrication of a semiconductor device configured to:

receive a mask load instruction, a location of a memory operand and a location of corresponding mask bits associated with the memory operand and a location of a destination location;

break the memory operand into a first plurality of sub-operands; and for each sub-operand of the first plurality of sub-operands, execute the mask load instruction on the sub-operand using a fastpath operation, wherein the processor loads the sub-operand into the destination location based upon the corresponding mask bits, and determine if a fault occurred while executing the mask load instruction on the sub-operand using the fastpath operation; and in response to determining that the fault occurred for at least one of the first plurality of sub-operands, break the memory operand into a second plurality of sub-operands, the second plurality of sub-operands having more sub-operands than the first plurality of sub-operands.

23. The computer-readable non-transitory medium of claim 22, wherein the computer-executable instructions or data represent layout designs for photolithography masks utilized to fabricate semiconductor device.

24. The computer-readable non-transitory medium of claim 23, wherein the layout designs for the photolithography masks define the semiconductor device such that the semiconductor device is further configured to:

execute the mask load instruction on each of the second plurality of sub-operands using microcode, wherein the processor loads each of the second plurality of sub-operands into the destination location based upon the corresponding mask bits.

25. The computer-readable non-transitory medium of claim 23, wherein the layout designs for the photolithography masks define the semiconductor device such that the semiconductor device is further configured to load each of the plurality of sub-operands into a destination location based upon a respective position of the each of the plurality of sub-operands within the memory operand.

26. The computer-readable non-transitory medium of claim 23, wherein the layout designs for the photolithography masks define the semiconductor device such that the semiconductor device is further configured to break the memory operand into a plurality of sub-operands based upon a type of mask load instruction received by the processor.

27. The computer-readable non-transitory medium of claim 23, wherein the layout designs for the photolithography masks define the semiconductor device such that the semiconductor device is further configured to load 0's into a respective sub-operand if the respective sub-operand is masked.

* * * * *